(12) United States Patent
Uesugi

(10) Patent No.: US 7,916,770 B2
(45) Date of Patent: Mar. 29, 2011

(54) METHOD OF GENERATING SPREADING CODES, CDMA TRANSMISSION APPARATUS, AND CDMA RECEPTION APPARATUS

(75) Inventor: Mitsuru Uesugi, Yokosuka (JP)

(73) Assignee: Panasonic Corporation, Osaka (JP)

( * ) Notice: Subject to any disclaimer, the term of this patent is extended or adjusted under 35 U.S.C. 154(b) by 1456 days.

(21) Appl. No.: 10/563,248

(22) PCT Filed: Jun. 28, 2004

(86) PCT No.: PCT/JP2004/009449
§ 371 (c)(1),
(2), (4) Date: Jan. 4, 2006

(87) PCT Pub. No.: WO2005/006623
PCT Pub. Date: Jan. 20, 2005

(65) Prior Publication Data
US 2006/0198342 A1  Sep. 7, 2006

(30) Foreign Application Priority Data
Jul. 10, 2003 (JP) .................. 2003-272882

(51) Int. Cl.
  *H04B 1/00* (2006.01)
(52) U.S. Cl. .................. 375/140; 375/146; 375/147
(58) Field of Classification Search .......... 375/130–152, 375/235, 260, 261, 298; 370/203, 335, 206, 370/319, 320, 336, 342, 343, 441, 442; 341/173; 342/150–155; 333/193–196; 455/39, 91, 455/103, 112, 118, 9
See application file for complete search history.

(56) References Cited

U.S. PATENT DOCUMENTS

| 3,099,795 | A | | 7/1963 | Frank | |
|---|---|---|---|---|---|
| 6,154,443 | A | * | 11/2000 | Huang et al. | 370/210 |
| 6,560,194 | B1 | * | 5/2003 | Gourgue et al. | 370/203 |
| 6,625,136 | B1 | * | 9/2003 | Niegel et al. | 370/335 |
| 6,667,708 | B2 | * | 12/2003 | Schooler et al. | 341/173 |
| 7,324,434 | B2 | * | 1/2008 | Sawahashi et al. | 370/208 |
| 7,330,496 | B2 | * | 2/2008 | Ohmi et al. | 375/130 |
| 7,372,891 | B1 | * | 5/2008 | Widdowson et al. | 375/146 |
| 2002/0150067 | A1 | * | 10/2002 | Feria et al. | 370/335 |
| 2004/0042386 | A1 | * | 3/2004 | Uesugi et al. | 370/204 |
| 2005/0018753 | A1 | * | 1/2005 | Ohmi et al. | 375/141 |

(Continued)

FOREIGN PATENT DOCUMENTS

EP  1 278 309  1/2003

(Continued)

OTHER PUBLICATIONS

Dinan et al., Spreading Codes For Direct Sequence CDMA and Wideband CDMA Cellular Networks, Sep. 1998, Communications Magazine, IEEE, vol. 36, pp. 48-55.*

(Continued)

*Primary Examiner* — Tesfaldet Bocure
*Assistant Examiner* — Lawrence B Williams
(74) *Attorney, Agent, or Firm* — Dickinson Wright PLLC

(57) ABSTRACT

$e^{j(2n\pi/N)}$ calculating section 101 generates a bth chip C(a,b) of an ath spreading code based on $C(a,b)=e^{j(2n\pi/N)}$ where e is a base of natural logarithm and N is a length of the spreading code (i.e. spreading code length). It is assumed in the above equation that n=a×b, a=0~N−1, and b=0~N−1. It is thereby possible to generate orthogonal spreading codes with arbitrary lengths.

2 Claims, 13 Drawing Sheets

U.S. PATENT DOCUMENTS

| | | | |
|---|---|---|---|
| 2005/0031018 A1* | 2/2005 | Papadimitriou et al. | 375/141 |
| 2010/0014562 A1* | 1/2010 | Tanaka | 375/130 |
| 2010/0014563 A1* | 1/2010 | Tanaka | 375/130 |

FOREIGN PATENT DOCUMENTS

| | | |
|---|---|---|
| JP | 07107007 | 4/1995 |
| JP | 10164009 | 6/1998 |
| JP | 2000115130 | 4/2000 |
| JP | 2003046481 | 2/2003 |
| WO | 9820639 | 5/1998 |

OTHER PUBLICATIONS

Cha et al., Design of Collision Free Codes Based On MAI-Free Principles, Dec. 2006, Intelligent Information Hiding and Multimedia Signal Processing, 2006, IIH-MSP'06, International Conference on, pp. 639-642.*

Ojha et al., impact of Noise and Target Fluctuation on the Performance of Frank Polyphase Coded Radar Signals, Mar. 1-3, 1992, System theory, 1992, Proceedings, SSST/CSA 92. The 24th Southeastern Symposium on and The 3rd Annual Symposium on Communications, Signal Processing Expert Systems, and ASIC VLSI Design, pp. 615-619.*

Ojha, A., Impact Of Noise And Target Fluctuation On The Performance Of Frank Polyphase Coded Radar Signals, Mar. 1-3, 1992, System Theory, 1992, Proceedings. SSST/CSA 92. The 24th Southeastern Symposium on the 3rd Annual Symposium on Communications, Signal Processing Expert Systems, and ASIC VLSI Design, pp. 615-619.*

Suehiro, N., Asynchronous SSMA System Using Secret Polyphase Orthogonal Sequences With Elimination Filter For Co-Channel Interference, Sep. 17-19, 1992, Systems Engineering, 1992., IEEE International Conference on, pp. 119-122.*

Suehiro, N., Binary or Quadrature Signal Design For Approximately Synchronized CDMA Systems Without Detection Sidelobe Nor Co-channel Interference, Sep. 22-25, 1996, Spread spectrum Technologies and applications Proceedings, 1996., IEEE 4th International Symposium on, vol. 2, pp. 650-656.*

PCT International Search Report dated Aug. 17, 2004.

Robert L. Frank; "Polyphase Codes with Good Non periodic Correlation Properties," IEEE Transactions on Information Theory, vol. 9, issue: Jan. 1963, pp. 43-45.

European Search Report dated Jul. 2, 2010.

* cited by examiner

SPREADING
CODE 0
(a=0)

SPREADING
CODE 1
(a=1)

SPREADING
CODE 2
(a=2)

FIG. 14

3-factor SPREADING $X([3,1]) = [1,1,1]$ 6-factor SPREADING $X([3,1][2,1]) = X([3,1]) | X([3,1])$ $X([3,1][2,2]) = X([3,1]) | -X([3,1])$ 18-factor SPREADING $X([3,1][2,1][3,1]) = X([3,1][2,1]) | X([3,1][2,1]) | X([3,1][2,1])$ $X([3,1][2,1][3,2]) = X([3,1][2,1]) | X([3,1][2,1])e^{j\frac{2\pi}{3}} | X([3,1][2,1])e^{j\frac{4\pi}{3}}$ $X([3,1][2,1][3,3]) = X([3,1][2,1]) | X([3,1][2,1])e^{j\frac{4\pi}{3}} | X([3,1][2,1])e^{j\frac{8\pi}{3}}$ 12-factor SPREADING $X([3,1][2,2][2,1]) = X([3,1][2,2]) | X([3,1][2,2])$ $X([3,1][2,2][2,2]) = X([3,1][2,2]) | -X([3,1][2,2])$ 9-factor SPREADING $X([3,2][3,1]) = X([3,1]) | X([3,1]) | X([3,1])$ $X([3,2][3,2]) = X([3,2]) | X([3,2])e^{j\frac{2\pi}{3}} | X([3,2])e^{j\frac{4\pi}{3}}$ $X([3,2][3,3]) = X([3,2]) | X([3,2])e^{j\frac{4\pi}{3}} | X([3,2])e^{j\frac{8\pi}{3}}$ $X([3,2]) = [1, e^{j\frac{2\pi}{3}}, e^{j\frac{4\pi}{3}}]$ $X([3,3]) = [1, e^{j\frac{4\pi}{3}}, e^{j\frac{8\pi}{3}}]$ 15-factor SPREADING $X([3,3][5,1]) = X([2,3]) | X([3,3]) | X([3,3]) | X([3,3]) | X([3,3])$ $X([3,3][5,2]) = X([3,3]) | X([3,3])e^{j\frac{2\pi}{5}} | X([3,3])e^{j\frac{4\pi}{5}} | X([3,3])e^{j\frac{6\pi}{5}} | X([3,3])e^{j\frac{8\pi}{5}}$ $X([3,3][5,3]) = X([3,3]) | X([3,3])e^{j\frac{4\pi}{5}} | X([3,3])e^{j\frac{8\pi}{5}} | X([3,3])e^{j\frac{12\pi}{5}} | X([3,3])e^{j\frac{16\pi}{5}}$ $X([3,3][5,4]) = X([3,3]) | X([3,3])e^{j\frac{6\pi}{5}} | X([3,3])e^{j\frac{12\pi}{5}} | X([3,3])e^{j\frac{18\pi}{5}} | X([3,3])e^{j\frac{24\pi}{5}}$ $X([3,3][5,5]) = X([3,3]) | X([3,3])e^{j\frac{8\pi}{5}} | X([3,3])e^{j\frac{16\pi}{5}} | X([3,3])e^{j\frac{24\pi}{5}} | X([3,3])e^{j\frac{32\pi}{5}}$

900 CDMA TRANSMISSION APPARATUS

1000 CDMA RECEPTION APPARATUS

METHOD OF GENERATING SPREADING CODES, CDMA TRANSMISSION APPARATUS, AND CDMA RECEPTION APPARATUS

TECHNICAL FIELD

The present invention relates to a method of generating spreading codes, CDMA transmission apparatus and CDMA reception apparatus, and more particularly, to a method of generating orthogonal spreading codes, and a CDMA transmission apparatus and CDMA reception apparatus using the orthogonal spreading codes.

BACKGROUND ART

Conventionally, in CDMA communication systems, the transmission side spreads a transmission symbol with a spreading code, and the reception side obtains a reception symbol by despreading with the same spreading code. At this point, to prevent interference of signals among channels, it is general to use spreading codes orthogonal to one another among the channels.

A method of generating the orthogonal codes is disclosed in JP H12-115130, for example.

Whether or not the orthogonality is maintained among spreading codes largely affects the communication quality in CDMA communications. Therefore, when the synchronization between spreading codes and similarity of channels is ensured, orthogonal codes are generally used. Actually, all the spreading codes are made synchronized completely on downlink, and even when the multipath exists, it is ensured that all the spreading codes are transmitted on the same channel. Devices are sometimes made for the ensuring on uplink.

Therefore, in CDMA communications, how many more orthogonal codes can be generated efficiently affects the system communication capacity (the number of channels) greatly.

FIG. 1 illustrates a general configuration of a conventional CDMA transmission apparatus, and FIG. 2 illustrates a general configuration of a conventional CDMA reception apparatus. In addition, in FIGS. 1 and 2, for simplicity in descriptions, one-code multiplexing is illustrated as an example. In CDMA transmission apparatus 10, mapping section 12 maps transmission data at predetermined positions on the I-Q plane corresponding to a modulation scheme such as QPSK (Quadrature Phase Shift Keying) and 16 QAM (Quadrature Amplitude Modulation) thereby obtains an I component and Q component, and outputs the I component and Q component to symbol copy section 14 in spreading section 13.

Symbol copy section 14 makes a number of copies of the I components and Q components corresponding to the spreading-factor and outputs to subsequent multiplying section 15. For example, when spreading section 13 performs 4-factor spreading, the section 14 makes four copies of the I components and Q components. Further, spreading codes generated in spreading code generating section 11 are input to multiplying section 15. For example, when 4-factor spreading is performed, spreading code generating section 11 generates spreading codes such as "1, −1, 1, −1" and "1, 1, 1, 1" orthogonal to "1, −1, 1, −1" and input to multiplying section 15.

As a result, multiplying section 15 sequentially multiplies elements of the spreading codes by the I components and Q components, and for example, when the spreading code is "1, −1, 1, −1", outputs in an order of "I, −I, −I, I" for the I component, while outputting in an order of "Q, −Q, Q, −Q" for the Q component. In addition, the case herein described is that the same spreading code is multiplied by the I component and Q component, but a method using different spreading codes to multiply by the I component and Q component, or a method performing complex multiplication may be adopted.

The I component and Q component thus spread in spreading section 13 are output to quadrature modulation section 17 via filter 16. Quadrature modulation section 17 modulates signals with their phases orthogonal to each other using the I component and Q component, thereby performs quadrature modulation processing, and transmits a quadrature modulated transmission signal via antenna 18.

CDMA reception apparatus 20 as shown in FIG. 2 receives the transmission signal transmitted from CDMA transmission apparatus 10 in antenna 22 and inputs to quadrature demodulation section 23. Quadrature demodulation section 23 multiplies the reception signal by a sine signal or cosine signal orthogonal in phase that is the same signal used on in quadrature modulation section 17 (FIG. 1), and thereby detects the I component and Q component prior to quadrature modulation. The detected I component and Q component are output to multiplying section 26 in despreading section 25 via filter 24.

Spreading codes generated in spreading code generating section 21 are input to multiplying section 26. The spreading codes generated at this point are the same codes as the spreading codes generated in spreading code generating section 11 in CDMA transmission apparatus 10. By this means, the multiplied I component and Q component are respectively "I, I, I, I" and "Q, Q, Q, Q", for example, in 4-factor spreading.

Inter-symbol adding section 27 adds the same numbers of I components and Q components as the number of copies made in symbol copy section 14 in CDMA transmission apparatus 10, for each component. In 4-factor spreading, the section 27 adds four I components and four Q components, and outputs thus obtained I components and Q components of one item of data to demapping section 28.

Demapping section 28 performs processing inverse to that in mapping section 12 in CDMA transmission apparatus 10, and obtains reception data corresponding to mapping positions of the I components and Q components. It is thus possible to obtain the reception data corresponding to the transmission data transmitted from CDMA transmission apparatus 10.

However, since a sequence of "1, −1" (i.e. either numeric value 1 or −1) is used for spreading codes in conventional CDMA communications, it is inevitable that the length of the code becomes powers of two to generate orthogonal codes having high use efficiency. This imposes a significant restriction on determining parameters of the system such as the length of a frame and a basic clock. For example, when the basic clock is made coincident with that in another system, the design becomes very difficult. Actually, in W-CDMA specified in 3GPP (3rd Generation Partnership Project), the restriction limits the chip rate to 3.84 Mcps, and similarly, in cdma 2000 specified in 3GPP2, the chip rate is 1.228 Mcps.

DISCLOSURE OF INVENTION

It is an object of the present invention to provide a method of generating spreading codes, and CDMA transmission and reception apparatuses enabling generation of spreading codes with arbitrary lengths.

This object is achieved by generating a bth chip C(a,b) of an ath spreading code by the following equation where e is a base of natural logarithm and N is a length of a spreading code (i.e. spreading code length):

$$C(a,b) = e^{j(2a\pi b/N)} \tag{1}$$

In Eq. (1), it is assumed that n=a×b, a takes values of 0 to N−1 (a=0~n−1), and that b takes values of 0 to N−1 (b=0~N−1).

It is thereby possible to generate spreading codes with orthogonality and arbitrary spreading code lengths N (N is any natural numbers).

BRIEF DESCRIPTION OF THE DRAWINGS

FIG. 14 is a view of a code tree to explain Embodiment 4;

BEST MODE FOR CARRYING OUT THE INVENTION

Embodiments of the present invention will specifically be described below with reference to accompanying drawings.

Embodiment 1

Figure 1:
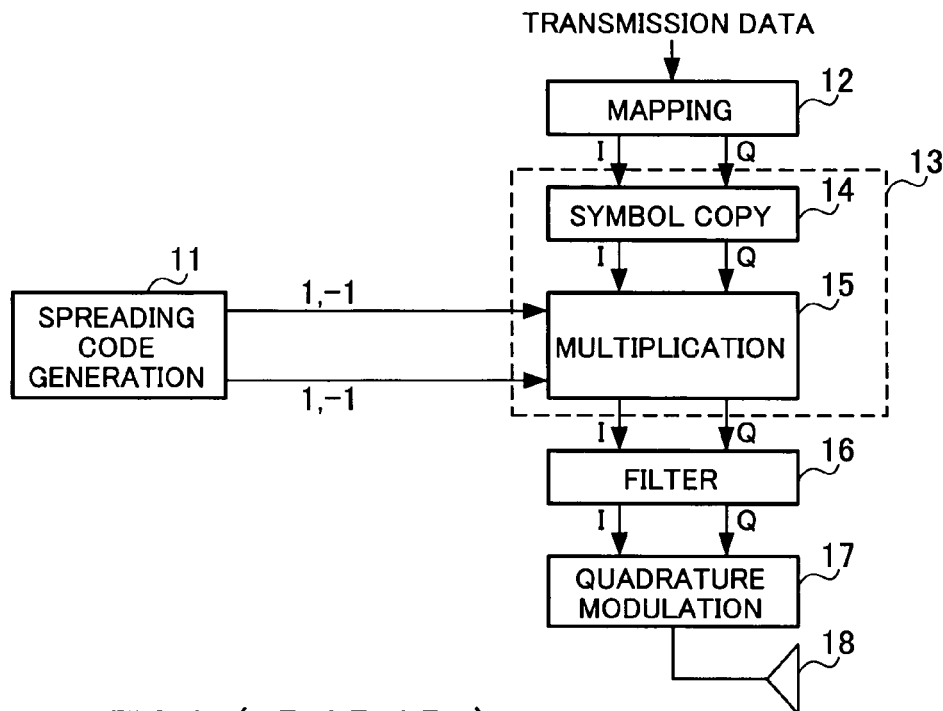
FIG. 1 is a block diagram illustrating a configuration of a conventional CDMA transmission apparatus.
Figure 2:
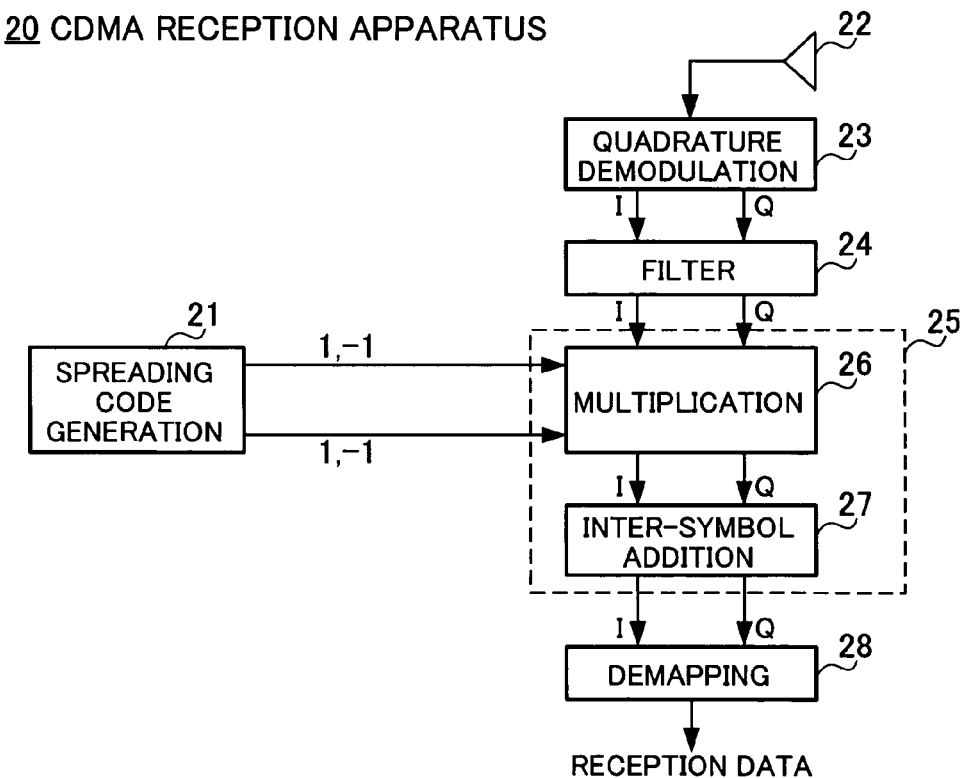
FIG. 2 is a block diagram illustrating a configuration of a conventional CDMA reception apparatus.
Figure 3:
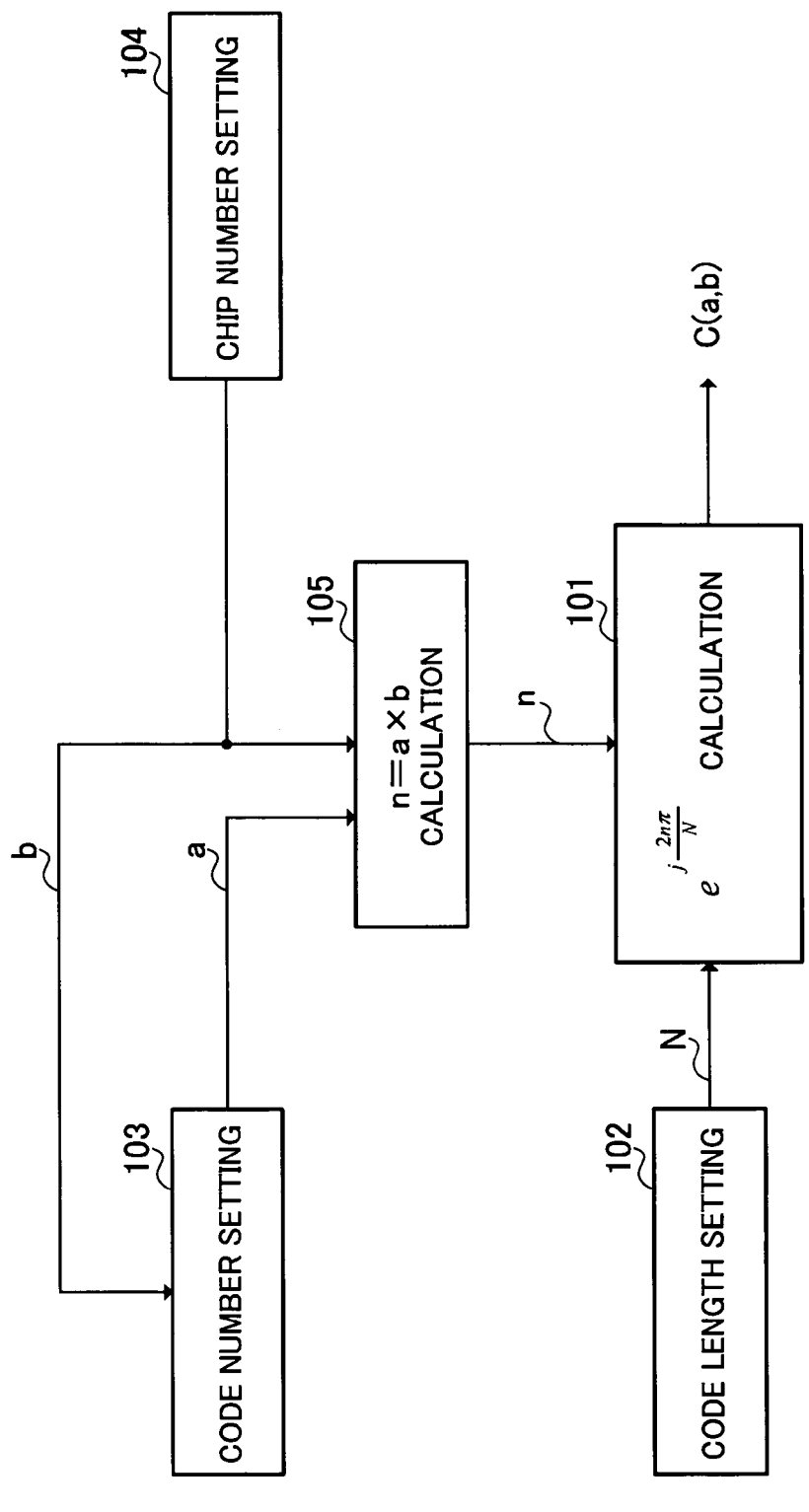
FIG. 3 is a block diagram illustrating a configuration of a spreading code generating apparatus of Embodiment 1.

FIG. 3 shows an example of a configuration of a spreading code generating apparatus to implement a method of generating spreading codes of the invention. Spreading code generating apparatus 100 has $e^{j(2n\pi/N)}$ calculating section 101. An arbitrary natural number N set in code length setting section 102 is input to $e^{j(2n\pi/N)}$ calculating section 101. The section 101 is set for a code number a by code number setting section 103, and further set for a chip number b by chip number setting section 104. Then, n=a×b calculating section 105 multiplies the code number a by the chip number b, and inputs a multiplication value n to $e^{j(2n\pi/N)}$ calculating section 101. As a result, $e^{j(2n\pi/N)}$ calculating section 101 sequentially generates a bth (b=0~N−1) chip C(a,b) of an ath (a=0~N−1) spreading code with an arbitrary length of N.

Figure 4:
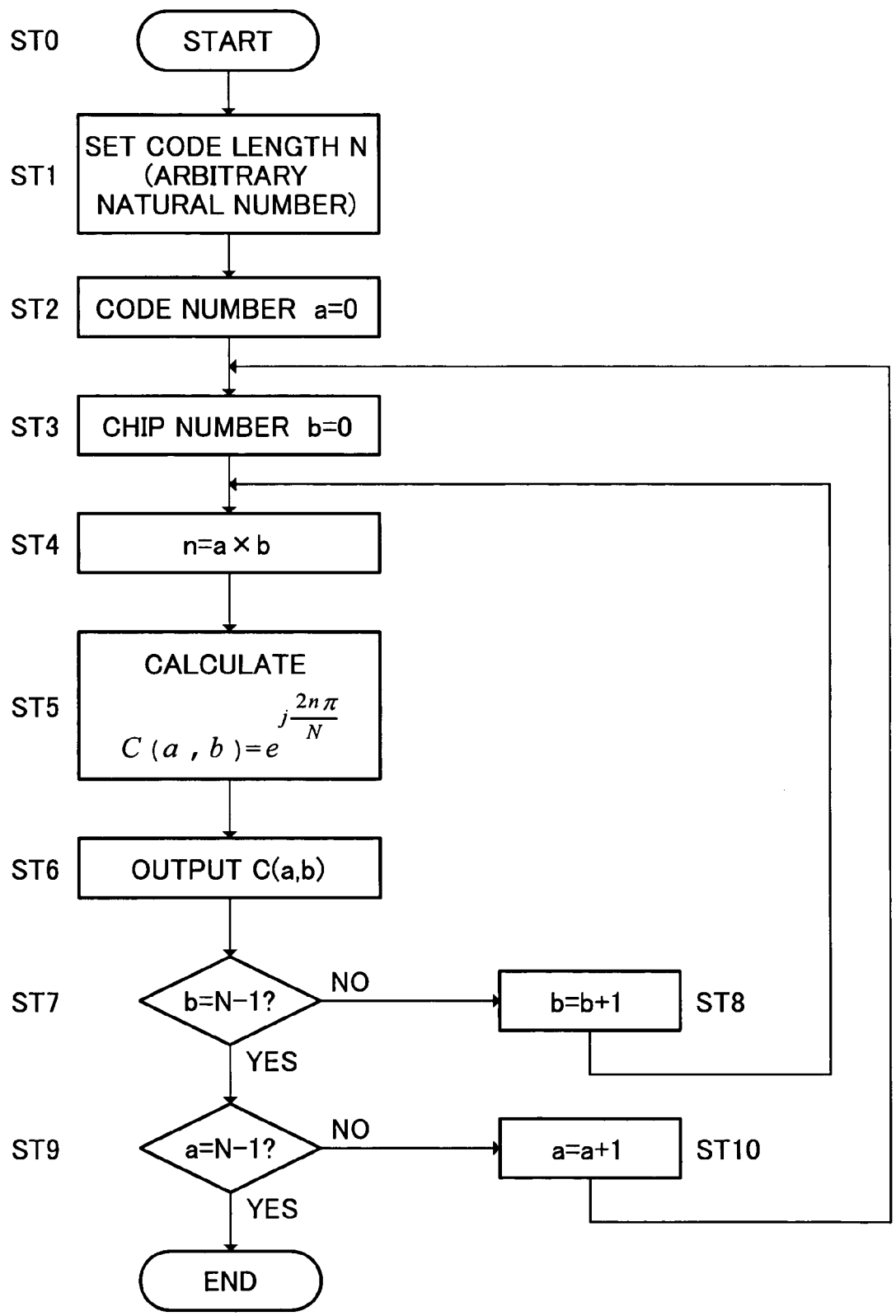
FIG. 4 is a flowchart illustrating procedures of generating spreading codes in the spreading code generating apparatus of Embodiment 1.

FIG. 4 shows procedures of generating spreading codes in spreading code generating apparatus 100. Spreading code generating apparatus 100 starts processing in step ST0, and sets a code length N in code length setting section 102 in step ST1. In subsequent step ST2 the apparatus 100 sets 0 on a code number a of code number setting section 103, and further sets 0 on a chip number b of chip number setting section 104 in step ST3.

In subsequent step ST4, the apparatus 100 calculates n in n=a×b calculating section 105, and shifts to step ST5. In step ST5, $e^{j(2n\pi/N)}$ calculating section 101 calculates a value of a bth chip C(a,b) of an ath spreading code, and outputs values of C(a,b) of one chip in step ST6.

Next, spreading code generating apparatus 100 shifts to step ST7, determines whether or not the chip number b is N−1, and, when b is not N−1 (actually, when b is less than N−1), shifts to step ST8 to increment the chip number b, and returns to step ST4. Spreading code generating apparatus 100 repeats a loop of steps ST4-ST5-ST6-ST7-ST8-ST4 and thereby generates sequentially chips with chip numbers b starting from 0 to N−1 on a spreading code with the code number a based on the fixed code number a, and thus generates the spreading code with the code length N on the code number a.

When the spreading code with the code length N is generated on the code number a, a positive result is obtained in step ST7, and the apparatus 100 shifts to step ST10 via step ST9 and increments the code number a. Then, spreading code generating apparatus 100 shifts to step ST3, and resets the chip number b to 0. Then, in the same way as described above, the apparatus 100 repeats a loop of steps ST4-ST5-ST6-ST7-ST8-ST4, thereby generates sequentially chips with chip numbers b ranging from 0 to N−1 on a spreading code with the code number a+1 based on the fixed code number a+1, and thus generates the spreading code with the code length N on the code number a+1.

The aforementioned processing is performed until the code number a is N−1 and a positive result is obtained in step ST9. Actually, the processing as shown in FIG. 4 is achieved by constituting chip number setting section 104 of FIG. 3 with a counter that repeatedly counts up the chip number b from 0 to N−1 automatically, and further constituting code number setting section 103 with a counter that counts up a count (i.e. the code number a) from 0 to N−1 whenever chip number setting section 104 outputs 0 as the chip number b.

Thus, according to spreading code generating apparatus 100, it is possible to generate N types (corresponding to the number of code numbers a) of spreading codes with code lengths N. In addition, the case is described in FIG. 4 where the code number a is incremented from 0 to N−1 to generate N types of spreading codes, but it may also be possible to generate only a desired number of spreading codes less than N types. In this case, a criteria value for a in step ST9 is made smaller than N−1.

Figure 5:
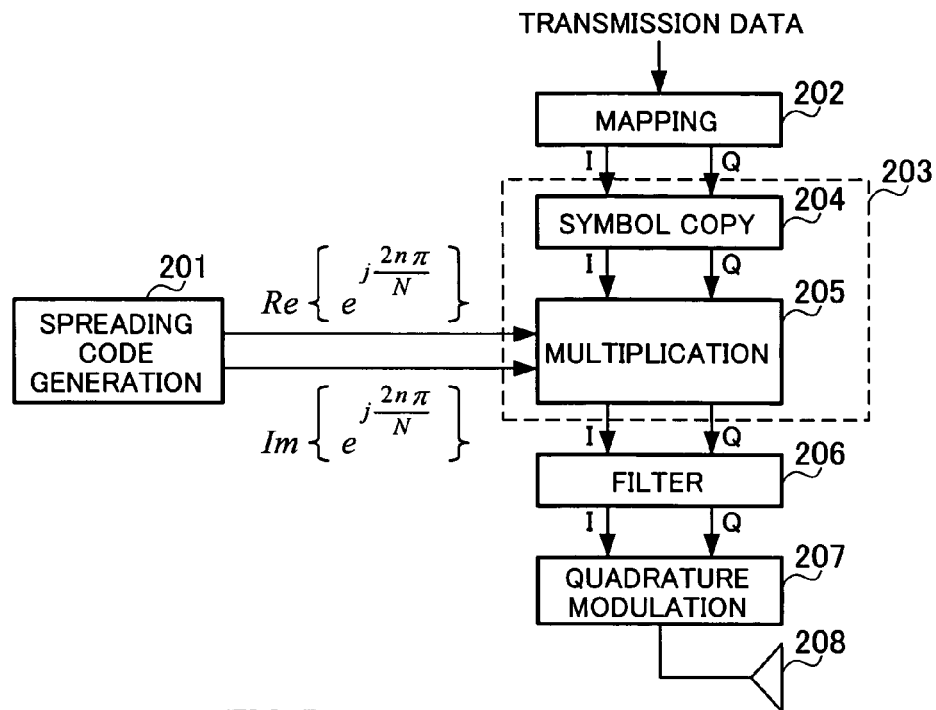
FIG. 5 is a block diagram illustrating a configuration of a CDMA transmission apparatus of Embodiment 1.
Figure 6:
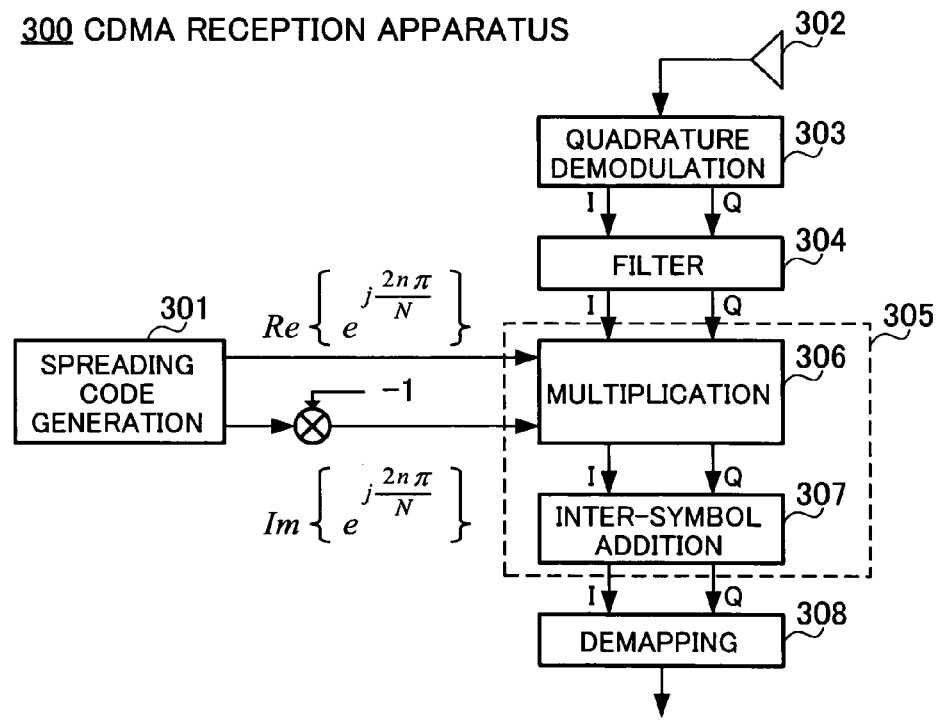
FIG. 6 is a block diagram illustrating a configuration of a CDMA reception apparatus of Embodiment 1.

FIG. 5 shows an example of a CDMA transmission apparatus using the spreading codes of the invention. Further, FIG. 6 shows an example of a CDMA reception apparatus using the spreading codes of the invention. In FIGS. 5 and 6, for simplicity in descriptions, one-code multiplexing is described as an example.

In CDMA transmission apparatus 200, mapping section 202 maps transmission data at predetermined positions on the I-Q plane corresponding to a modulation scheme such as QPSK (Quadrature Phase Shift Keying) and 16 QAM (Quadrature Amplitude Modulation) and thereby obtains an I component and Q component and outputs the I component and Q component to symbol copy section 204 in spreading section 203.

Symbol copy section 204 makes N copies of the I components and Q components corresponding to the spreading-factor to output to subsequent multiplying section 205. For example, when 3-factor spreading is performed in spreading section 203, symbol copy section 204 makes three copies of I components and Q components. Further, spreading codes generated in spreading code generating section 201 are input to multiplying section 205.

Spreading code generating section 201 generates spreading codes based on above-mentioned Eq. (1). Specific examples of configuration are as described in FIG. 3 and FIG. 4. For example, when 3-factor spreading is performed, spreading code generating section 203 generates spreading codes such as "1, 1, 1" and "1, $e^{j(2\pi/3)}$, $e^{j(4\pi/3)}$" and "1, $e^{j(4\pi/3)}$, $e^{j(8\pi/3)}$" orthogonal to "1, 1, 1" and outputs them to multiplying section 205.

Actually, the spreading code $e^{j(2n\pi/N)}$ is a complex number, and in FIG. 5, a real part of the spreading code $e^{j(2n\pi/N)}$ output from spreading code generating section 201 is shown by $Re\{e^{j(2n\pi/N)}\}$, while an imaginary part of the code is shown by $Im\{e^{j(2n\pi/N)}\}$. Multiplying section 205 regards the copied I component and Q component as a complex number of I+jQ, and sequentially complex-multiples the complex number by the real part $Re\{e^{j(2n\pi/N)}\}$ and the imaginary part $Im\{e^{j(2n\pi/N)}\}$ of each chip C(a,b) of the spreading code $e^{j(2n\pi/N)}$ with a predetermined code number a. Results of the multiplication are thereby as expressed in following equations.

$$I = I \times Re\{e^{j(2n\pi/N)}\} - Q \times Im\{e^{j(2n\pi/N)}\}$$

$$Q = Q \times Re\{e^{j(2n\pi/N)}\} + I \times Im\{e^{j(2n\pi/N)}\} \quad (2)$$

Thus, spreading section 205 performs spreading processing using spreading codes $e^{j(2n\pi/N)}$, and outputs spread I component and Q component to quadrature modulation section 207 via filter 206. Quadrature modulation section 207, by modulating signals with their phases orthogonal to each other using the I component and Q component, performs quadrature modulation processing and transmits a quadrature modulated transmission signal via antenna 208.

FIG. 6 illustrates a configuration of CDMA reception apparatus 300 that receives a signal transmitted from CDMA transmission apparatus 200. CDMA reception apparatus 300 receives the transmission signal transmitted from CDMA transmission apparatus 200 in antenna 302 to input to quadrature demodulation section 303. Quadrature demodulation section 303 multiplies the reception signal by a sine signal or cosine signal orthogonal in phase that is the same signal used in quadrature modulation section 207 (FIG. 5), and thereby detects the I component and Q component prior to quadrature modulation. The detected I component and Q component are output to multiplying section 306 in despreading section 305 via filter 304.

Spreading codes generated in spreading code generating section 301 are input to multiplying section 306. Spreading code generating section 301 has the same configuration as that of spreading code generating section 201 (FIG. 5) at the transmission side, and generates spreading codes as expressed in Eq. (1) as described above. In addition, among outputs from spreading code generating section 301, the real part $Re\{e^{j(2n\pi/N)}\}$ is input to multiplying section 306 without change, while the imaginary part $Im\{e^{j(2n\pi/N)}\}$ is input to multiplying section 306 via a sign inverting circuit.

As a result, a spreading code $e^{-j(2n\pi/N)}$ that is a complex conjugate of the spreading code $e^{j(2n\pi/N)}$ is input to multiplying section 306. In other words, assuming that e is a base of natural logarithm and N is a length of a spreading code (i.e. spreading code length), a spreading code is input such that a bth chip C*(a,b) of an ath spreading code is expressed in the following equation:

$$C^*(a,b) = e^{-j(2n\pi/N)} \quad (3)$$

In addition, in Eq. (3), it is assumed that n=a×b, a takes values of 0 to N−1 (a=0~n−1), b takes values of 0 to N−1 (b=0~N−1), and that C*(a,b) represents a complex conjugate of C(a,b).

Multiplying section 306 regards the received I component and Q component as a complex number of I+jQ, and sequentially complex-multiples the complex number by the real part $Re\{e^{-j(2n\pi/N)}\}$ and the imaginary part $Im\{e^{-j(2n\pi/N)}\}$ of each chip C*(a,b) of the spreading code $e^{-j(2n\pi/N)}$ with a predetermined code number a. The complex multiplied I component and Q component are output to inter-symbol adding section 307. Inter-symbol adding section 307 adds I components and Q components corresponding to one symbol, for each component.

Thus, despreading section 305 performs despreading processing using spreading codes $e^{-j(2n\pi/N)}$, and outputs added I components and Q components corresponding to one symbol to demapping section 308. Demapping section 308 outputs reception data corresponding to mapping positions of the I components and Q components. It is thereby possible to obtain the reception data corresponding to the transmission data.

The reason will be described below why orthogonality is ensured among codes, and symbols spread at the transmission side can be divided with excellence at the reception side, by using spreading codes $e^{j(2n\pi/N)}$ generated by the method of generating spreading codes of the invention.

First, it is assumed that an ith symbol is S(a,i) that is spread with a spreading code $e^{j(2n\pi/N)}$ (n=a×b, a is fixed, and b=0~N−1) with a code number a, N copies of the symbol are P(a, i, b), and that the relationship between S(a, i) and P(a, i, b) is expressed by the following equation:

$$S(a,i) = P(a,i,b) \quad (4)$$

where b=0~N−1.

A received signal R (a, i, b) of an ith symbol that is spread with the spreading code C(a, b)=$e^{j(2n\pi/N)}$ (n=a×b, a is fixed, and b=0~N−1) is expressed by the following equation:

$$R(a,i,b) = P(a,i,b) \cdot C(a,b) \quad (5)$$

where a is fixed and b=0~N−1.

The following equation expresses a despreading result Q(a, i) obtained by despreading the received signal R(a, i, b) with the spreading code C*(a, b)=$e^{-j(2n\pi/N)}$ (n=a×b, a is fixed, and b=0~N−1):

$$Q(a,i) = \sum_{b=0}^{N-1} R(a,i,b) \cdot C^*(a,b) \quad (6)$$

$$= \sum_{b=0}^{N-1} P(a,i,b) \cdot C(a,b) \cdot C^*(a,b)$$

$$= \sum_{b=0}^{N-1} P(a,i,b) \cdot |C(a,b)|^2$$

$$= \sum_{b=0}^{N-1} P(a,i,b) \cdot 1 = N \cdot S(a,i)$$

As a result, as can be seen from Eq. (6), it is possible to extract a signal spread with the ath spreading code with accuracy at the reception side by the spreading code that is a complex conjugate of the ath spreading code.

In contrast thereto, the signal spread with the ath spreading code cannot be extracted by despreading using a spreading code (for example, a+1th spreading code) that is different from the ath spreading code. This will be described below. The case of N=3 is taken as an example. In this case, spreading code generating section 201 generates three spreading codes as described below:

Spreading code 0 (a=0): [1, 1, 1]
Spreading code 1 (a=1): [1, $e^{j(2\pi/3)}$, $e^{j(4\pi/3)}$]
Spreading code 2 (a=2): [1, $e^{j(4\pi/3)}$, $e^{j(8\pi/3)}$]

As an example, considering the case where a signal spread with spreading code 1 is despread with a complex conjugate of spreading code 2, a despreading result Q(2, i) is as expressed in the following equation:

$$Q(2,i) = \sum_{b=0}^{2} R(l,i,b) \cdot C^*(2,b) \qquad (7)$$

$$= P(l,i,b) \cdot 1 \cdot 1 + P(1,i,1) \cdot$$

$$e^{j\frac{2\pi}{3}} \cdot e^{-j\frac{4\pi}{3}} + P(l,i,2) \cdot e^{j\frac{4\pi}{3}} \cdot e^{-j\frac{8\pi}{3}}$$

$$= P(1,i,0) + P(1,i,1) \cdot e^{-j\frac{2\pi}{3}} + P(1,i,2) \cdot e^{-j\frac{4\pi}{3}}$$

$$= S(1,i) + S(1,i)\left\{-\frac{1}{2} - j\frac{\sqrt{3}}{2}\right\} + S(1,i)\left\{-\frac{1}{2} - j\frac{\sqrt{3}}{2}\right\}$$

$$= 0$$

As can be seen from Eq. (7), when the despreading processing is performed using a spreading code different from that when spreading, the despreading result is 0. In other words, it is understandable that spreading codes generated in spreading code generating section 201 are orthogonal to one another. This relationship holds for any natural numbers N and any combinations of spreading codes. In other words, spreading code generating section 201 is capable of generating N orthogonal spreading codes with respect to any natural number N.

Figure 7A:
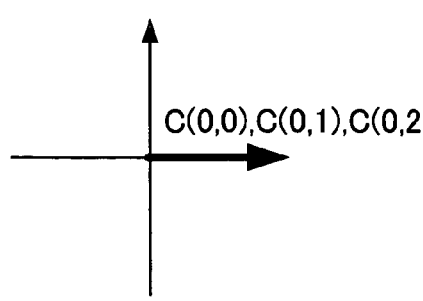
FIG. 7A is an explanatory view of orthogonality of spreading codes of the invention.
Figure 7B:
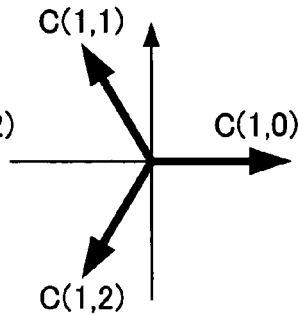
FIG. 7B is another explanatory view of orthogonality of spreading codes of the invention.
Figure 7C:
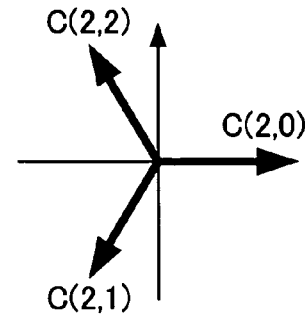
FIG. 7C is another explanatory view of orthogonality of spreading codes of the invention.

Referring to FIGS. 7 and 8, orthogonality of spreading codes obtained in the invention will be described below more specifically. FIGS. 7A, 7B and 7C respectively show spreading codes 0 to 2 (a=0~2) with the spreading-factor of 3 on a two dimensional plane.

Figure 8A:
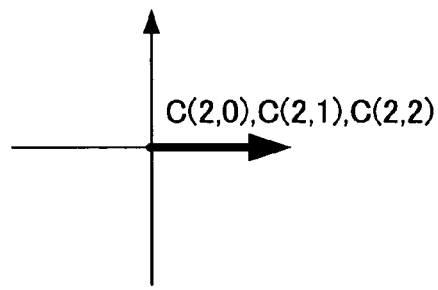
FIG. 8A is another explanatory view of orthogonality of spreading codes of the invention.
Figure 8B:
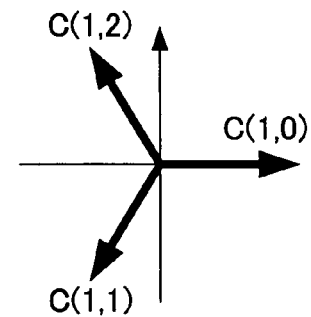
FIG. 8B is still another explanatory view of orthogonality of spreading codes of the invention.

FIG. 8A shows a result obtained by despreading a signal spread with spreading code 2 (a=2) with a complex conjugate of spreading code 2, and FIG. 8B shows a result obtained by despreading a signal spread with spreading code 1 (a=1) with a complex conjugate of spreading code 2.

As shown in FIG. 8A, when the signal spread with spreading code 2 (a=2) is despread with the complex conjugate of spreading code 2, three chips are added in phase, in other words, all of vectors of C(2, 0), C(2, 1) and C(2, 2) in FIG. 8A direct in the same direction, and the signal spread with spreading code 2 can be extracted with accuracy.

In contrast thereto, as shown in FIG. 8B, when the signal spread with spreading code 1 is despread with the complex conjugate of spreading code 2, three chips resulting from multiplying C*(2, 0), C*(2, 1) or C*(2, 2) direct in different directions spaced 120° from one another, and the despreading result is 0. It is thus understandable that despreading with different spreading codes results in 0 (i.e. being orthogonal). The same results can be obtained in combinations of other spreading codes and any numbers N.

Thus, according to this Embodiment, since spreading codes are generated as expressed in Eq. (1), it is possible to generate spreading codes with arbitrary lengths orthogonal to one another. It is thereby possible to make it easy to design a CDMA system, for example.

In addition, the method of generating spreading codes of the invention is similar to the case of generating each orthogonal signal in OFDM. Subcarriers orthogonal to one another are generated in OFDM. The spreading codes generated in the invention correspond to 0 Hz to (N−1) Hz in OFDM. However, the actual use and effects are greatly different from those in OFDM, and it is possible to obtain processing that cannot be implemented in OFDM and specific effects that cannot be obtained in OFDM, by using as spreading codes. The differences from OFDM will be described below.

When N subcarriers are generated in OFDM, the same signal sequence as C(a,b) shown in Eq. (1) is used as a time waveform. However, the time waveform itself transmitted to air is generated by such a method in OFDM. In other words, a signal generated in OFDM is a continuous time waveform, and when the continuity is interrupted, the transmission spectrum is significantly affected, and spreading of the spectrum out of the band become extremely large. Therefore, in OFDM, only extremely minute processing such as filtering that limits the entire band can be performed on the time waveform in a range of FFT. Extensive processing causes significant deterioration in performance and in transmission spectrum.

In contrast thereto, it is fundamental in the invention using spreading codes generated in Eq. (1) in CDMA, and the invention enables chips subsequent to spreading to be treated independently. In other words, it is possible to provide chips with any processing (process). For example, chip may be provided with some processing as performed in general CDMA such as band limitations for chip with a root Nyquist filter, unequal chip intervals, insertion of an chip of another signal (such as a pilot signal and control signal) in between chips, change in the chip order and scrambling.

In particular, by using a method of changing the order of chips as described later in Embodiment 2 or a method of performing scrambling as described later in Embodiment 3, a new effect is produced that makes it possible to use OFDM used only in an isolated cell in cellular with interference with other cells. In other words, in OFDM, since Eq. (1) is used for generating orthogonal subcarriers, a temporally-continuous time waveform is generated and processing on the waveform is limited to severely restricted processing. In contrast thereto, in the invention, since spreading codes are generated using Eq. (1), various processing can be performed on spread chips. Further, in performing various processing, the code length is not limited to power-of-two, and it is thereby possible to diversify a configuration of an apparatus to perform each processing.

As can be seen from the foregoing, the invention features using codes of waveforms similar in OFDM, but is distinguished in subject of use, and results in splendid differences in the effect. In addition, signals cannot be divided for each path in OFDM, but in CDMA where band limitations are performed for chips using a root Nyquist filter and the like, since it is possible to separate paths as in general CDMA, the diversity effect can be obtained by RAKE reception.

Embodiment 2

A feature of this Embodiment is changing the order of chips in spreading codes generated based on Eq. (1).

In order to change the order of chips, chip interleaving can be performed after generating spreading codes with a code length N based on Eq. (1), or a spreading code with the order of chips changed can first be generated by performing calculation as shown in the following equation:

$$C(a,b) = e^{j(2f(n)\pi/N)} \quad (8)$$

In Eq. (8), f(n) is a function to arbitrarily change the order on an input n in one-to-one correspondence, and for example, on the condition that n=3, is a function such that f(0)=1, f(1)=0, and f(2)=2.

Figure 9:
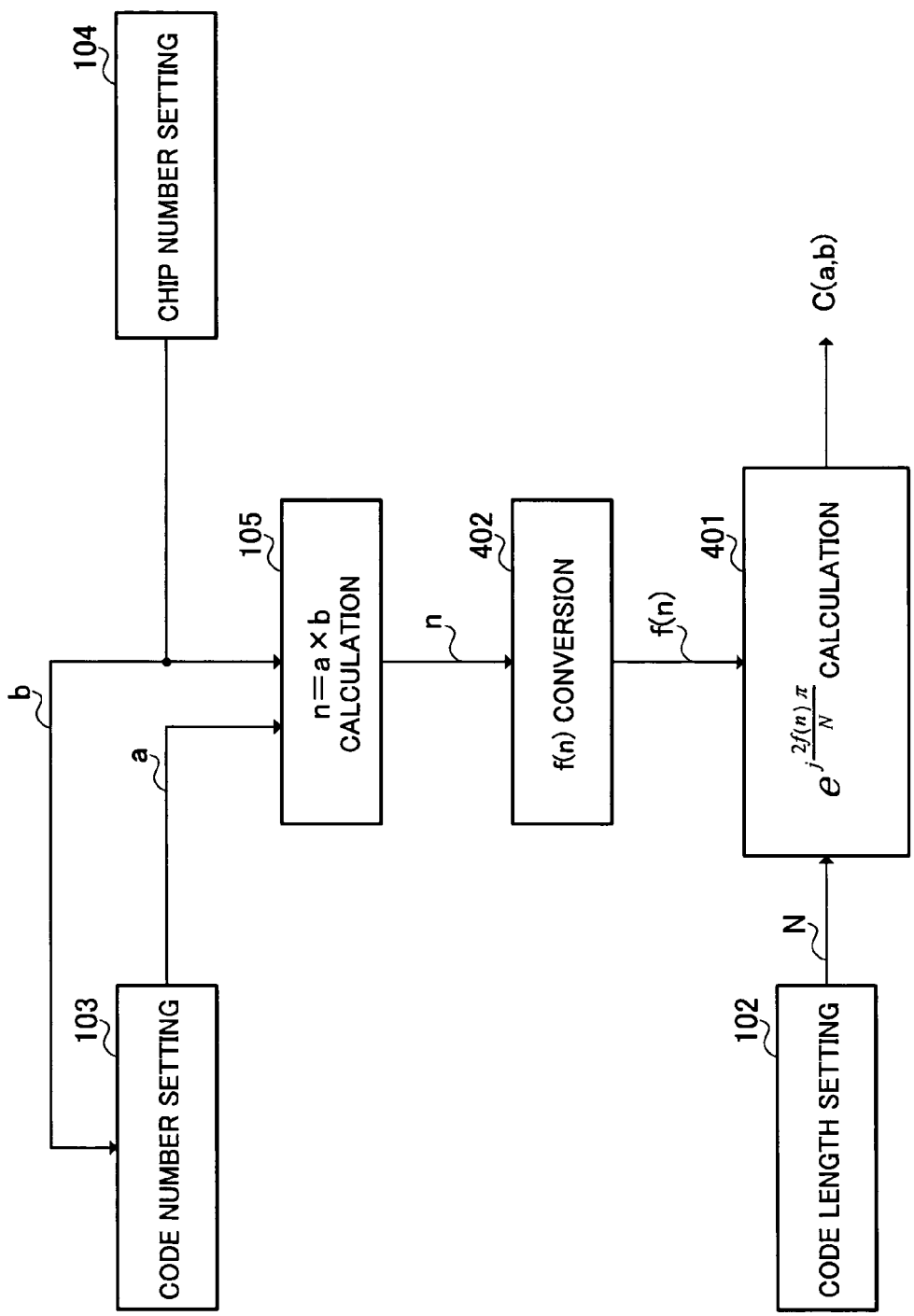
FIG. 9 is a block diagram illustrating a configuration of a spreading code generating apparatus of Embodiment 2.

FIG. 9 shows an example of a configuration of a spreading code generating apparatus to implement Eq. (8). In FIG. 9 with the same reference numerals assigned to corresponding sections in FIG. 3, spreading code generating apparatus 400 has the same configuration as that of spreading code generating apparatus 100 in FIG. 3, except provision of $e^{j(2f(n)\pi/N)}$ calculating section 401 as a substitute for $e^{j(2n\pi/N)}$ calculating section 101 (in addition, $e^{j(2f(n)\pi/N)}$ calculating section 401 has the same configuration as that of $e^{j(2n\pi/N)}$ calculating section 101 except an input value of f(n) that is different from n) and provision of f(n) transform section 402 that transforms a numeric value n obtained in n=a×b calculating section 105 into another numeric value f(n).

Figure 10:
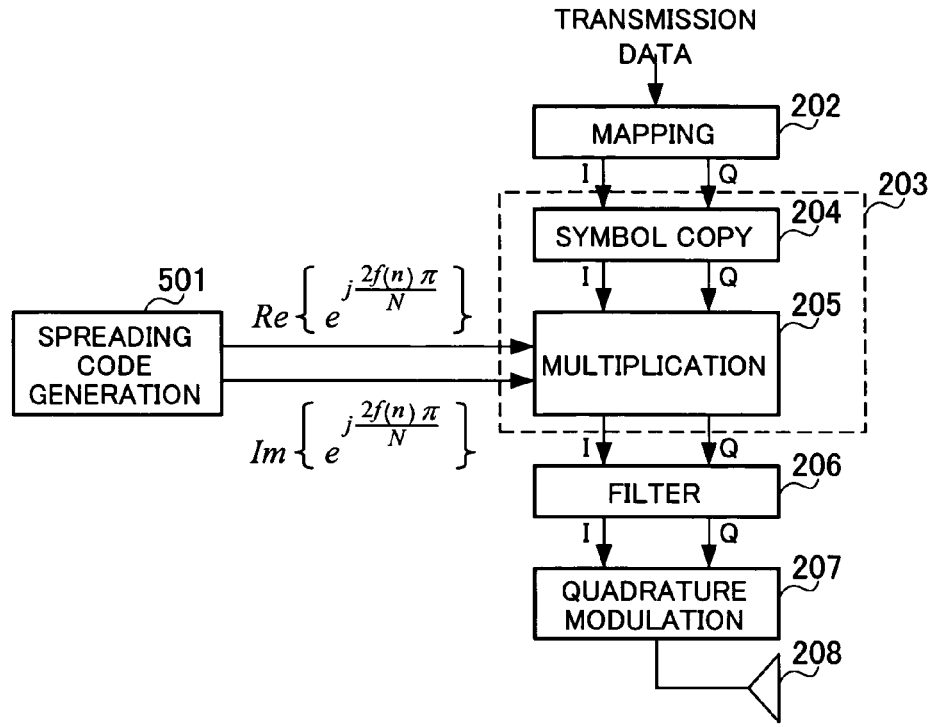
FIG. 10 is a block diagram illustrating a configuration of a CDMA transmission apparatus of Embodiment 2.
Figure 11:
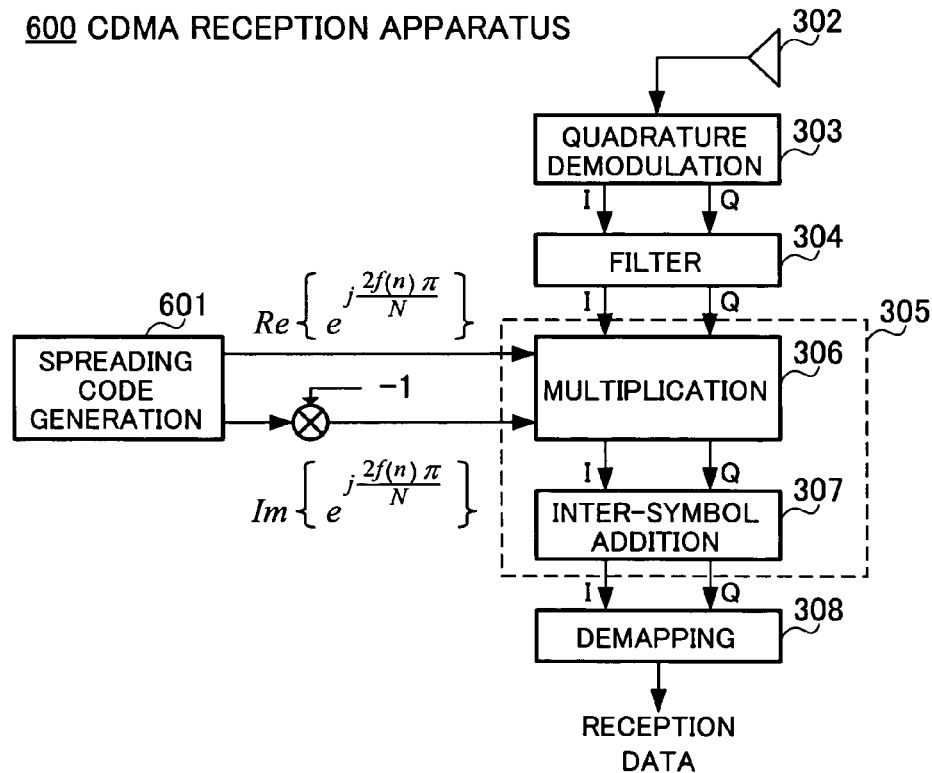
FIG. 11 is a block diagram illustrating a configuration of a CDMA reception apparatus of Embodiment 2.

FIG. 10 shows an example of a CDMA transmission apparatus of this Embodiment with the same reference numerals assigned to corresponding sections in FIG. 5. FIG. 11 shows an example of a CDMA reception apparatus of this Embodiment with the same reference numerals assigned to corresponding sections in FIG. 6. The difference between CDMA transmission apparatus 500 in this Embodiment and CDMA transmission apparatus 200 in Embodiment 1 is that CDMA transmission apparatus 500 generates a spreading code with the chip order changed in spreading code generating section 501 and performs spreading processing using the spreading code. Similarly, the difference between CDMA reception apparatus 600 in this Embodiment and CDMA reception apparatus 300 in Embodiment 1 is that CDMA reception apparatus 600 generates a spreading code with the chip order changed in spreading code generating section 601 and performs despreading processing using the spreading code. Spreading code generating sections 501 and 601 can be configured as shown in FIG. 9, for example.

By this means, the transmission side is capable of performing the spreading processing on a transmission signal while changing the order of chips of spreading codes with an arbitrarily code length N orthogonal to one another, and the reception side is capable of extracting a desired signal with accuracy from a code division multiplexed signal.

Thus, in this Embodiment, in addition to the configuration of Embodiment 1, chips of a spreading code are changed as appropriate, and for example, following effects can be obtained.

An effect of averaging the correlation among codes: When a spreading-factor is large, there is a possibility that a channel is changed between the first chip and the last chip, and in this case, the orthogonality among particular codes largely deteriorates and increases the correlation among the codes. Even in such a case, by changing the order of chips, it is possible to average the correlation so that almost the same correlation is obtained among all the spreading codes not depending on the spreading codes. It is thus possible to improve the effect of error correcting code, and make it easy to cancel interference by correlation (despreading).

An effect of reducing interference with other cells: By making the order of chips different from those in other cells (assigning different order variation patterns for each cell), it is possible to average the correlation with the other cells, and obtain almost the same effect as in scrambling.

An effect of randomizing the influence of multipath: Interference occurs among chips when multipath exists, but randomizing the order of chips randomizes occurrences of interference, and as a result, it is possible to improve the effect of error correcting code and facilitate cancellation of interference by correlation (despreading).

Embodiment 3

Figure 12:
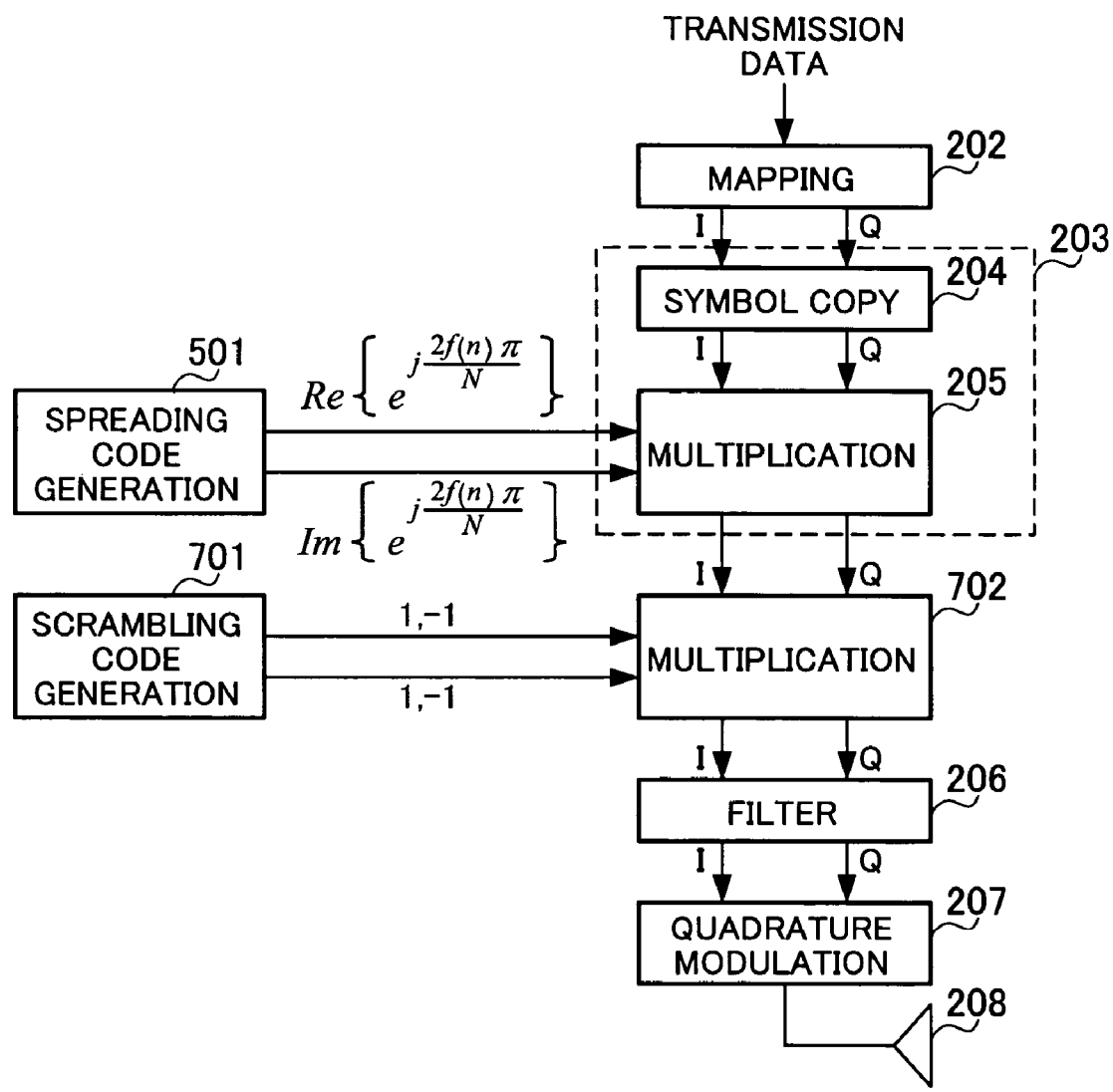
FIG. 12 is a block diagram illustrating a configuration of a CDMA transmission apparatus of Embodiment 3.
Figure 13:
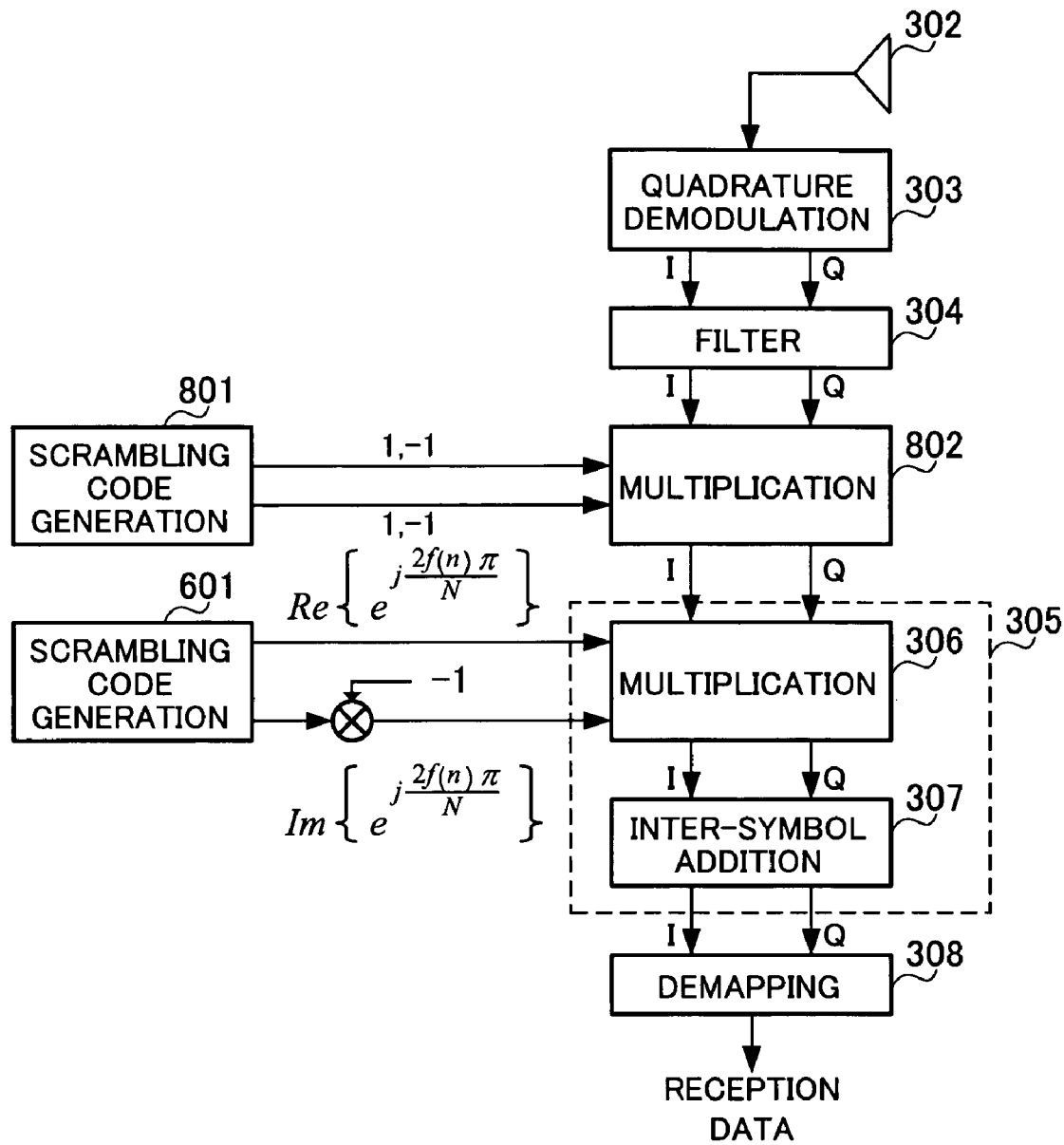
FIG. 13 is a block diagram illustrating a configuration of a CDMA reception apparatus of Embodiment 3.

FIG. 12 illustrates a configuration of a CDMA transmission apparatus of this Embodiment with the same reference numerals assigned to corresponding sections in FIG. 10. CDMA transmission apparatus 700 has scrambling code generating section 701, and multiples in multiplying section 702 a spread signal by a scrambling code generated in scrambling code generating apparatus 701. FIG. 13 illustrates a configuration of a CDMA reception apparatus of this Embodiment that receives and demodulates a signal from CDMA transmission apparatus 700, with the same reference numerals assigned to corresponding sections in FIG. 11. CDMA reception apparatus 800 has scrambling code generating section 801, and multiples in multiplying section 802 a signal prior to despreading by a scrambling code generated in scrambling code generating apparatus 801. Naturally, scrambling code generating section 801 generates the same scrambling code as in scrambling code generating section 701.

In the aforementioned configuration, CDMA transmission apparatus 700 of this Embodiment performs scrambling processing, in addition to performing the spreading processing using spreading codes generated in spreading code generating section 501. The scrambling processing is general processing to enable distinguishing from other cells in CDMA communications. Further, in this Embodiment, by performing the scrambling processing in a combination with spreading codes of the invention as described above, as well as the distinguishing from other cells, following specific effects are produced which cannot be obtained in general CDMA communications.

First, it is possible to reduce the correlation among chips. In general CDMA, a phase between chips is 0, π or ±π/4, and a phase difference between chips varies with the spreading code, and the effect of a delay signal differs to some extent for chips and is averaged. In contrast thereto, when spreading codes of the invention are used and rearrangement of chips is assumed not to be performed, since the phase differences between chips are equal in any spreading codes, the effect of a delay signal causes the correlation between chips. Taking this respect into account, it is desirable to randomize phase differences among spreading codes by performing the scrambling processing as in this Embodiment. It is thereby possible to enhance the error correcting capability at the reception side.

Further, when the scrambling processing is performed in addition to using spreading codes of the invention as in this Embodiment, it is possible to use codes other than [1, −1] as scrambling codes. In other words, when scrambling codes are generated, it is possible to generate scrambling codes with arbitrary lengths and periods and the order thereof changed by the same method as the method of generating spreading codes as described above. It is thereby possible to set the length of a scrambling code with ease and generate the code readily.

Thus, according to this Embodiment, the scrambling processing is performed as well as using spreading codes described in Embodiments 1 and 2, whereby in addition to the advantageous effects of Embodiments 1 and 2, it is possible to further improve error rate characteristics at the reception side, and to increase the number of usable scrambling codes.

In addition, while this Embodiment describes the case of multiplying a spread signal by a scrambling code, but the invention is not limited to such a case, and the same advantageous effects as in the aforementioned Embodiment can be obtained in the cases of multiplying a transmission signal prior to spreading or a spreading code itself by a scrambling code.

Embodiment 4

A feature of this Embodiment is generating spreading codes of the invention using a hierarchical code tree. It is thereby possible to generate more spreading codes while maintaining the orthogonality. The code tree has been used conventionally as a method of generating spreading codes with different spreading-factors orthogonal to one another, and for example, OVSF (Orthogonal Variable Spreading-Factor) codes are one example of spreading codes generated using the code tree.

FIG. 14 shows a code tree of this Embodiment. The code tree is to make codes with different spreading-factors orthogonal to each other, and for example, enables a 3-spreading-factor code and a 9-spreading-factor code to be orthogonal to each other. Further, it is possible to make codes with any lengths orthogonal to each other when a code has a length of an integral multiple of that of another code (basic code) with the smallest spreading-factor, as in 3-f spreading actor and 15-spreading factor. It is only required in the code tree that the spreading-factor of some code is an integral multiple of that of an upper code, and it is thus possible to make a 15-spreading-factor code and a 9-spreading factor code orthogonal to each other. Further, any hierarchical levels are available.

In the example of FIG. 14, a basic code has a spreading-factor of 3. X([A, B]) represents a Bth code with a spreading-factor of A. A code generated based on X([A, B]) is represented by X([A, B][C, D]) which represents a Dth code with the spreading-factor obtained by multiplying the spreading-factor of X([A, B]) by C. X([A, B])|X([A, B]) represents generating a code with the length twice as long as that of X ([A, B]) by arranging two X([A, B]) in a row. Similarly, X([A, B])|X([A, B]) Y|X ([A, B]) Z represents generating a code with the length three times as long as that of X([A, B]) by arranging X([A, B]), X([A, B]) multiplied by Y and X([A, B]) multiplied by Z in a row.

The OVSF codes conventionally used in CDMA are a specific case among the aforementioned codes, and the spreading-factor is always increased by two times. However, the spreading codes of the invention can generate orthogonal codes other than powers of two and therefore, as shown in FIG. 14, it is possible to generate codes with arbitrary spreading-factors.

In addition, by using the code tree, it is possible to generate codes all orthogonal to one another even in codes with different spreading codes (for example, in the example of FIG. 14, X([3, 1][2, 1][3, 1]) with the spreading-factor of 18 and X([3, 1][3, 2]) with the spreading-factor of 9. However, as in the OVSF codes, upper codes of an already used code cannot be used (for example, X([3, 1][2, 1]) and X([3, 1]) cannot be used when X([3, 1][2, 1][3, 1]) is used).

An advantage will be described below when spreading codes of the invention are generated using the code tree. The effect of generating the spreading codes of the invention using the code tree is the same as in the OVSH codes in such a respect that codes with different spreading-factors can be made orthogonal and multiplexed.

However, when the spreading codes of the invention are generated using the code tree, it is possible to generate spreading codes orthogonal to one another in spreading-factors very close to the basic-factor such as 18-factor spreading and 15-factor spreading, if only the basic spreading-factor (3 in the example of FIG. 14) is the same. It is thus possible to efficiently use resources remaining small odd resources in retransmission and the like, and facilitate a fine adjustment of resource allocation.

For example, with respect to the quality of communications, in the case where 16-factor spreading provides slightly less quality in 16 QAM (Quadrature Amplitude Modulation), while providing excessively adequate quality in QPSK (Quadrature Phase Shift Keying) the use has conventionally been limited to 16 QAM in 32-factor spreading or QPSK in 16-factor spreading. Such use is insufficient in effective use of resources.

In contrast thereto, the spreading codes of the invention generated using the code tree enable use of 16QAM in 18-factor spreading (if still insufficient, in 21-factor spreading), while inversely enabling use of QPSK in 15-factor spreading (if allowed more, in 12-factor spreading or 9-factor spreading).

Thus, according to this Embodiment, the spreading codes of the invention are generated using a hierarchical code tree, whereby in addition to the advantageous effects of Embodiment 1, it is possible to generate spreading codes with various spreading-factors while maintaining the orthogonality and enabling effective use of resources.

Embodiment 5

This Embodiment proposes performing collectively generation of spreading codes of the invention and spreading processing at a transmission side using an inverse Fourier transformer (IDFT), and further proposes performing collectively generation of spreading codes of the invention and despreading processing at a reception side using a Fourier transformer (DFT). It is thereby possible to reduce amounts of calculation.

Figure 15:
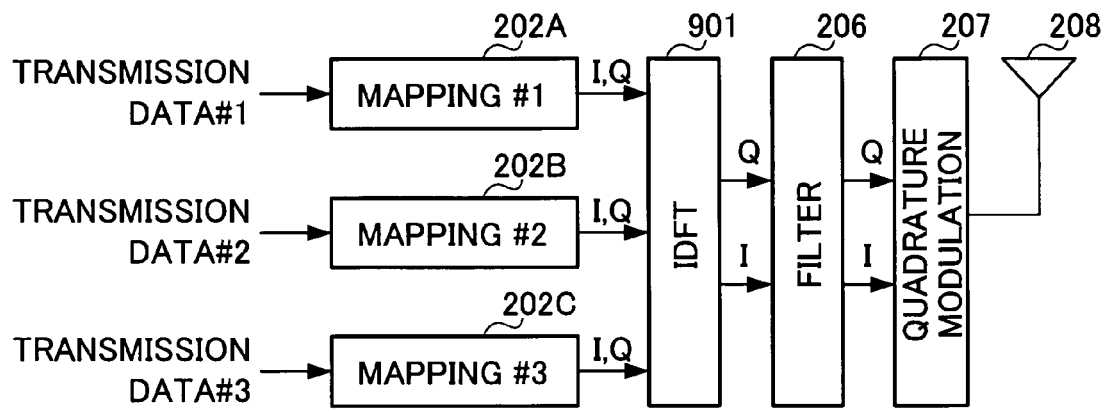
FIG. 15 is a block diagram illustrating a configuration of a CDMA transmission apparatus of Embodiment 5.

FIG. 15 illustrates a configuration of a CDMA transmission apparatus of this Embodiment with the same reference numerals assigned to corresponding sections in FIG. 5. CDMA transmission apparatus 900 inputs transmission data #1 to #3 to three-point inverse Fourier transformer (IDFT) 901 via mapping sections (mapping #1 to #3) 202A to 202C respectively.

Three-point IDFT 901 performs inverse Fourier transform processing on three inputs, and is thus capable of performing processing equal to generating three spreading codes corresponding to the case of N=3 in Eq. (1) and spreading transmission data #1 to #3 respectively with the three spreading codes. N-point inverse Fourier transform processing is a well-known technique, and not described specifically herein, but inverse Fourier transform enables the processing of spreading code generating section 201 and spreading section 203 in FIG. 5 to be collectively performed. It is thus possible to obtain the same spread signal as a code division multiplexed signal obtained by spreading transmission data #1 to #3 with spreading codes of Eq. (1) with a simplified configuration and with a small amount of calculation.

Figure 16:
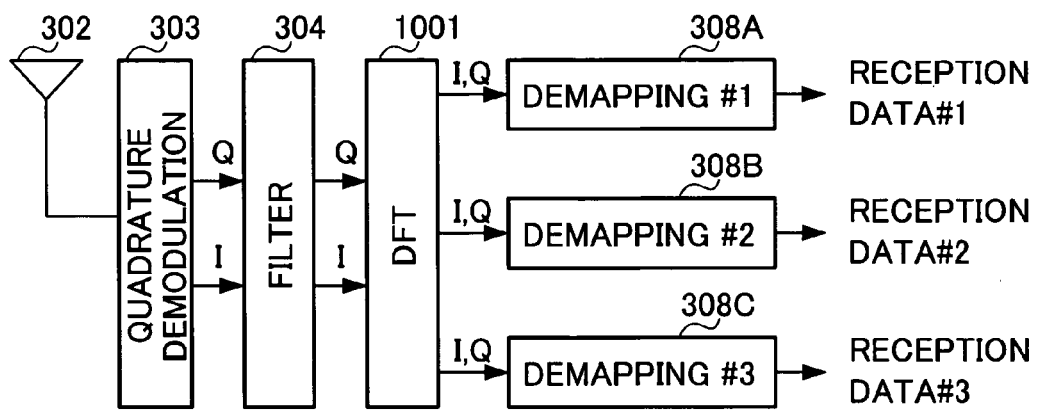
FIG. 16 is a block diagram illustrating a configuration of a CDMA reception apparatus of Embodiment 5.

FIG. 16 illustrates a configuration of CDMA reception apparatus 1000 that receives and demodulates a code division multiplexed signal transmitted from CDMA transmission apparatus 900, with the same reference numerals assigned to corresponding sections in FIG. 6. In CDMA reception apparatus 1000, I and Q components of a code division multiplexed signal output from filter 304 is input to three-point discrete Fourier transformer (DFT) 1001.

Three-point DFT 1001 performs three-point Fourier transform processing on an input signal, and is thus capable of performing processing equal to generating three spreading codes corresponding to the case of N=3 in Eq. (3) and despreading the code division multiplexed signal using the three spreading codes. N-point Fourier transform processing is a well-known technique as well as the N-point inverse Fourier transform processing, and not described specifically herein, but Fourier transform enables the processing of spreading code generating section 301 and despreading section 305 in FIG. 6 to be collectively performed. It is thus possible to divide the code division multiplexed signal into reception data #1 to #3 corresponding to transmission data #1 to #3 prior to multiplexing using spreading codes of Eq. (3) with a small amount of calculation and with a simplified configuration.

When generating spreading codes of the invention and performing the spreading or despreading processing using the spreading codes simply, a calculation amount of the order of a square of the number (N) of codes is required, but using IDFT or DFT as in this Embodiment requires a calculation amount of only of the order of log(N).

Thus, according to this Embodiment, the spreading processing using the spreading codes of the invention with inverse Fourier transformer 901 makes it possible to implement CDMA transmission apparatus 900 having a small amount of calculation, and the despreading processing using the spreading codes of the invention with Fourier transformer 1001 makes it possible to implement CDMA reception apparatus 1000 having a small amount of calculation.

In addition, as described in Embodiment 2, when the order of chips is changed at the transmission side, the reception side restores the order of chips and then performs DFT processing (or, input lines to DFT 1001 are adapted to the changed order of chips).

Further, as described in Embodiment 3, when the scrambling processing is performed at the transmission side, descrambling processing and then DFT processing are performed at the reception side.

Furthermore, this Embodiment describes the configuration of the case where transmission data #1 to #3 of three users is code division multiplexed and transmitted as one example, but the invention is not limited to the case where transmission data #1 to #3 of three users is code division multiplexed, and using N-point IDFT enables code division multiplexing of an arbitrary number N of items of transmission data.

Embodiment 6

In this Embodiment, as a method of reducing an amount of calculation when transmission and reception is performed using spreading codes with different spreading-factors as in Embodiment 4, proposed are a CDMA transmission apparatus where an inverse discrete Fourier transformer is cascaded as appropriate and a CDMA reception apparatus where a discrete Fourier transformer is cascaded as appropriate. In other words, in using spreading codes with different spreading-factors, IDFT (transmission side) or DFT (reception side) is used hierarchically.

Figure 17:
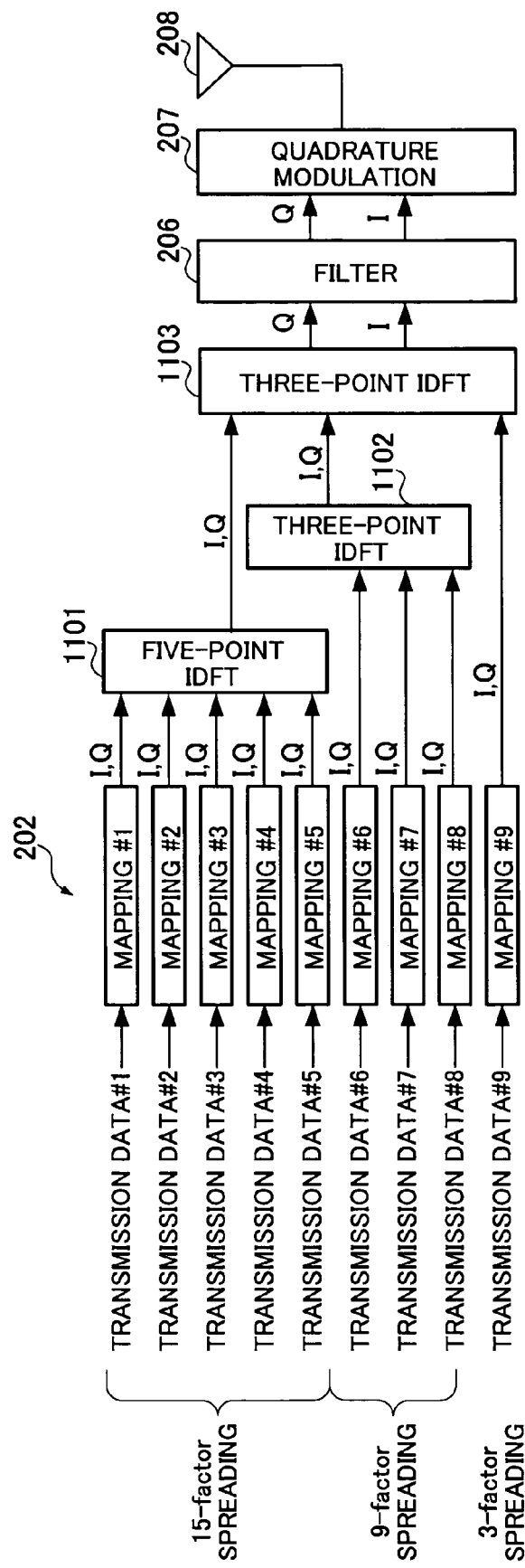
FIG. 17 is a block diagram illustrating a configuration of a CDMA transmission apparatus of Embodiment 6.

FIG. 17 illustrates a configuration of CDMA transmission apparatus 1100 of this Embodiment with the same reference numerals assigned to corresponding sections in FIG. 15. FIG. 17 shows an example of using five spreading codes with the spreading-factor of 15, three spreading codes with the spreading-factor of 9, and a spreading code with the spreading-factor of 3. In CDMA transmission apparatus 1100, transmission data #1 to #5 is input to five-point IDFT 1101 via mapping section 202, and five transmission data items #1 to #5 are thereby code division multiplexed using spreading codes with the spreading-factor of 5 (N=5 in Eq. (1)) by five-point IDFT. The code division multiplexed signal is input to three-point IDFT 1103.

Further, in CDMA transmission apparatus 1100, transmission data #6 to #8 is input to three-point IDFT 1102 via mapping section 202, and three transmission data items #6 to #8 are thereby code division multiplexed using spreading codes with the spreading-factor of 3 (N=3 in Eq. (1)) by three-point IDFT 1102. The code division multiplexed signal is input to three-point IDFT 1103.

Three-point IDFT 1103 receives the code division multiplexed signal from five-point IDFT 1101, the code division multiplexed signal from three-point IDFT 1102, and transmission data #9 via mapping section 202. Three-point IDFT 1103 code division multiplexes three inputs using spreading codes with spreading-factor of 3. As a result, three-point IDFT obtains a code division multiplexed signal of transmission data #1 to #5 spread in the spreading-factor of 15, transmission data #6 to #8 spread in the spreading-factor of 9, and transmission data #9 spread in the spreading-factor of 3.

Thus, by cascading a plurality of IDFTs 1101 to 1103, it is possible to perform the processing equal to code division multiplexing of transmission data using spreading codes with different spreading-factors.

Figure 18:
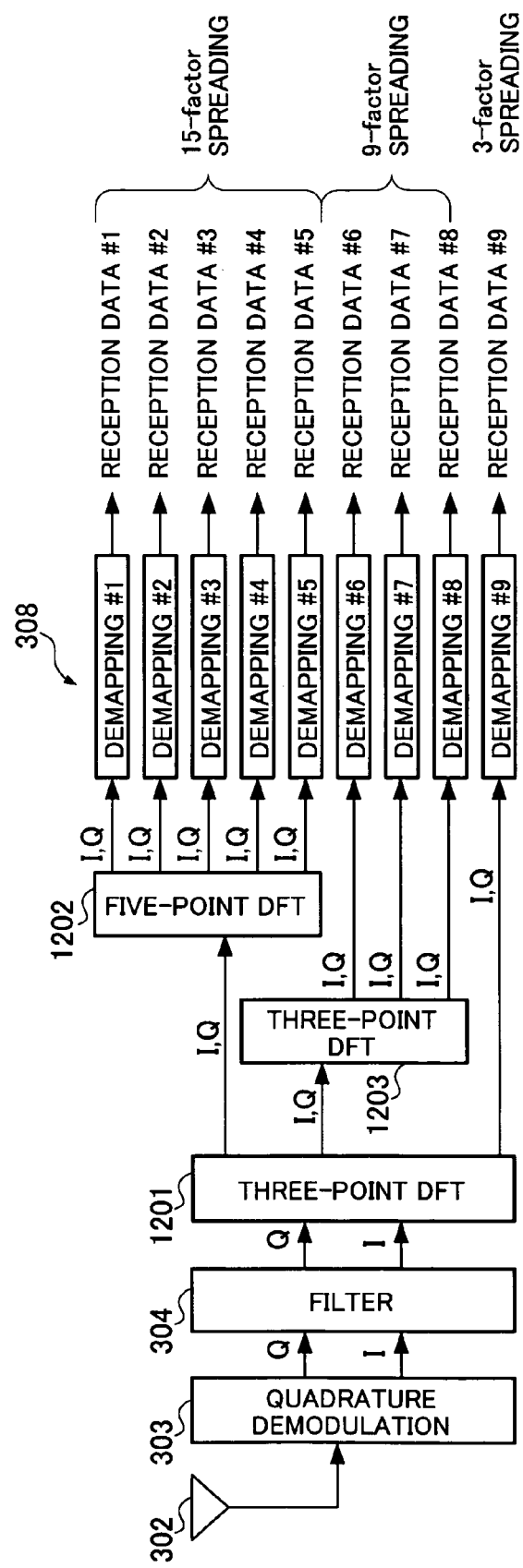
FIG. 18 is a block diagram illustrating a configuration of a CDMA reception apparatus of Embodiment 6.

FIG. 18 illustrates a configuration of a CDMA reception apparatus that receives and demodulates a signal transmitted from CDMA transmission apparatus 1100, with the same reference numerals assigned to corresponding sections in FIG. 16. In CDMA reception apparatus 1200, an output from filter 304 is first input to three-point DFT 1201. Three-point DFT 1201 outputs three outputs obtained by performing inverse Fourier transform operation corresponding to the despreading processing using spreading codes with the spreading-factor of 3 respectively to five-point DFT 1202, three-point DFT 1203 and demapping section 308 (demapping section #9).

Five-point DFT 1202 performs Fourier transform operation corresponding to the despreading processing using spreading codes with the spreading-factor of 5, and thereby obtains reception data #1 to #5 corresponding to transmission data #1 to #5. Further, three-point DFT 1203 performs Fourier transform operation corresponding to the despreading processing using spreading codes with the spreading-factor of 3, and thereby obtains reception data #6 to #8 corresponding to transmission data #6 to #8.

Thus, by cascading a plurality of DFTs 1201 to 1203 as appropriate, it is possible to restore each data prior to code division multiplexing from a signal obtained by code division multiplexing using spreading codes with different spreading codes.

In addition, CDMA transmission apparatus 1100 in FIG. 17 uses IDFTs in all hierarchical levels, and performs operation corresponding to generation of spreading codes of the invention and spreading, but the invention is not limited to such a case. In other words, in CDMA transmission apparatus 1100 in FIG. 17, as the hierarchical level increases, an input rate of the IDFT is increased, and the heaviest load is imposed on the last stage, IDFT 1103, in terms of operation power. In consideration thereof, even when IDFT 1103 is used only in the last stage and general matched filters are used substituting for prior stages, IDFTs 1101 and 1102, it is possible to reduce a significant amount of calculation.

Further, CDMA reception apparatus 1200 in FIG. 18 uses DFTs also in all hierarchical levels, and performs operation corresponding to generation of spreading codes of the invention and despreading, but the invention is not limited to such a case. In other words, in CDMA reception apparatus 1200 in FIG. 18, as the hierarchical level decreases, an input rate of the DFT is decreased (a signal with the chip rate is input to the first stage, DFT 1201, and signals with the rate one-third the chip rate are input to second stage, three-point DFT 1203 and five-point DFT 1202), and the heaviest load is imposed on the first stage, DFT 1201, in terms of operation power. In consideration thereof, even when only DFT 1201 is used in the first stage and general matched filters are used substituting for subsequent stages, DFTs 1202 and 1203, it is possible to reduce a significant amount of calculation. In addition, the spreading-factor of the first stage (spreading-factor of a basic code) in the code tree is the same in all the spreading codes, and therefore, it is always possible to use a DFT as the first stage.

Thus, according to this Embodiment, in using spreading codes with different spreading-factors as explained in Embodiment 4, hierarchical spreading processing is performed by cascading inverse discrete Fourier transformers 1101 to 1103 as appropriate, and it is thereby possible to implement CDMA transmission apparatus 1100 enabling reduction in an amount of calculation in using spreading codes with different spreading-factors. Similarly, in using spreading codes with different spreading-factors as explained in Embodiment 4, hierarchical despreading processing is performed by cascading discrete Fourier transformers 1201 to 1203 as appropriate, and it is thereby possible to implement CDMA reception apparatus 1200 enabling reduction in an amount of calculation in using spreading codes with different spreading-factors.

The present invention is not limited to the aforementioned Embodiments, and is capable of being carried into practice with various modifications thereof.

In an aspect of a method of generating spreading codes of the invention, a bth chip C(a,b) of an ath spreading code is generated by a following equation when it is assumed that e is a base of natural logarithm and N is a length of the spreading code (i.e. spreading code length):

$$C(a,b)=e^{j(2n\pi/N)} \quad (1)$$

where n=a×b, a=0~N−1, and b=0~N−1.

According to this method, it is possible to generate spreading codes with orthogonality and an arbitrary spreading code length N (N is any natural numbers).

In another aspect of the method of generating spreading codes, spreading codes with different spreading code length are generated by successively multiplying N in Eq. (1) by k (k is positive integers).

According to this method, it is possible to generate more spreading codes while maintaining the orthogonality. Actually, spreading codes with different spreading code length are generated hierarchically using a code tree, and in the invention, since it is possible to generate orthogonal codes while being not limited to codes of powers of two unlike the conventional case, it is possible to generate spreading codes with arbitrary spreading-factors. As a result, fine adjustments can be made to resources, in addition to further increases in the number of spreading codes.

An aspect of a CDMA transmission apparatus of the invention adopts a configuration provided with a spreading code generator that generates a bth chip C(a,b) of an ath spreading code by a following equation when it is assumed that e is a base of natural logarithm and N is a length of the spreading code (i.e. spreading code length):

$$C(a,b)=e^{j(2n\pi/N)} \quad (1)$$

where n=a×b, a=0~N−1, and b=0~N−1, and with a spreader that spreads a transmission signal using the spreading code generated in the spreading code generator.

According to this configuration, it is possible to generate spreading codes with orthogonality and an arbitrary spreading code length N (N is any natural numbers). As a result, by using the CDMA transmission apparatus of the invention, versatility is increased in frame length, basic clock and the like in a system, and it is thereby possible to facilitate the design of the CDMA system.

Another aspect of the CDMA transmission apparatus of the invention adopts a configuration where the spreading code generator rearranges the order of chips of the spreading code generated in Eq. (1) for spreading codes.

According to this configuration, for example, even when the channel variation occurs at high speed, it is possible to average the correlation among spreading codes, and it is thus possible to enhance the effect of error correcting code and to facilitate cancellation of interference by the correlation (despreading).

Another aspect of the CDMA transmission apparatus of the invention adopts a configuration further provided with a scrambler that multiplies the transmission signal, the spreading code or a spread signal by a scrambling code.

According to this configuration, in addition to the cell distinguishing effect, the correlation among chips can be reduced, and it is thus possible to further improve error rate characteristics on the reception side. A combination with spreading codes of the invention increases the number of usable scrambling codes.

Another aspect of the CDMA transmission apparatus of the invention adopts a configuration where the spreading code generator generates spreading codes with different spreading code length by successively multiplying N in Eq. (1) by k (k is positive integers).

According to this configuration, it is possible to generate more spreading codes while maintaining the orthogonality, and to further increase an amount of data concurrently transmissible. Moreover, since orthogonal codes can be generated being not limited to codes of powers of two, it is possible to generate spreading codes with arbitrary spreading-factors. As a result, it is possible to further increase the number of spreading codes to increase an amount of data concurrently transmissible, and to make fine adjustments to resources.

In another aspect of the CDMA transmission apparatus of the invention, an inverse discrete Fourier transformer is applied as to the spreading code generator and the spreader.

According to this configuration, it is possible to perform spreading processing using spreading codes expressed in Eq. (1) with a small amount of calculation.

In still another aspect of the CDMA transmission apparatus of the invention, a plurality of cascaded inverse discrete Fourier transformers is applied as the spreading code generator and the spreader, and performs inverse discrete Fourier transform on a transmission signal hierarchically.

According to this configuration, it is possible to reduce an amount of calculation when spreading processing is performed using spreading codes with different spreading-factors while hierarchically using the spreading codes as expressed in Eq. (1).

An aspect of a CDMA reception apparatus of the invention adopts a configuration provided with a spreading code generator that generates a bth chip C(a,b) of an ath spreading code by a following equation when it is assumed that e is a base of natural logarithm and N is a length of the spreading code (i.e. spreading code length):

$$C^*(a,b) = e^{j(2n\pi/N)} \quad (3)$$

where n=a×b, a=0~N−1, and b=0~N−1, and with a despreader that despreads a received signal using the spreading code generated in the spreading code generator.

In another aspect of the CDMA reception apparatus of the invention, a discrete Fourier transformer is applied to constitute the spreading code generator and the despreader.

In still another aspect of the CDMA reception apparatus of the invention, a plurality of cascaded discrete Fourier transformers is applied to the spreading code generator and the despreader, and performs discrete Fourier transform on a received signal hierarchically.

As described above, according to the present invention, it is possible to generate orthogonal spreading codes with arbitrary lengths. As a result, versatility is increased in frame length, basic clock and the like in a CDMA system, and it is thereby possible to facilitate the design of the CDMA system.

This application is based on the Japanese Patent Application No. 2003-272882 filed on Jul. 10, 2003, entire content of which is expressly incorporated by reference herein.

INDUSTRIAL APPLICABILITY

The present invention is suitable for use in a cellular telephone, base station and the like, for example.

The invention claimed is:

1. A CDMA transmission apparatus comprising:
a spreading code generator that generates a $b^{th}$ chip C(a,b) of an $a^{th}$ spreading code by a following equation, $$C(a,b) = e^{j(2n\pi/N)}$$

where e is a base of natural logarithm, N is a length of the spreading code, n=a×b, a=0~N−1, and b=0~N−1; and
a spreader that spreads a transmission signal using the spreading code generated in the spreading code generator, wherein:
a plurality of cascaded inverse discrete Fourier transformers are used to constitute the spreading code generator and the spreader, and perform inverse discrete Fourier transform on the transmission signal hierarchically.

2. A CDMA reception apparatus comprising:
a spreading code generator that generates a $b^{th}$ chip C(a,b) of an $a^{th}$ spreading code by a following equation, $$C^*(a,b) = e^{-j(2n\pi/N)}$$

where e is a base of natural logarithm, N is a length of the spreading code, n=a×b, a=0~N−1, and b=0~N−1; and
a despreader that despreads a received signal using the spreading code generated in the spreading code generator, wherein
a plurality of cascaded discrete Fourier transformers are used to constitute the spreading code generator and the despreader, and perform discrete Fourier transform on the received signal hierarchically.

* * * * *